United States Patent
McHugh et al.

(10) Patent No.: US 7,077,375 B1
(45) Date of Patent: Jul. 18, 2006

(54) FRAME FOR SUPPORTING TELECOMMUNICATIONS EQUIPMENT

(75) Inventors: Larry E. McHugh, Hiram, GA (US); Ronald Standifer, Dallas, GA (US); Michael R. Autry, Acworth, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/177,628

(22) Filed: Jul. 8, 2005

Related U.S. Application Data

(63) Continuation of application No. 10/288,108, filed on Nov. 5, 2002, now Pat. No. 6,981,685.

(51) Int. Cl.
  *F16M 1/00* (2006.01)
(52) U.S. Cl. ..................... 248/678; 248/637
(58) Field of Classification Search ............... 248/678, 248/188.1, 346.01, 346.03, 346.05, 448, 248/500, 505, 680, 499, 679, 637
  See application file for complete search history.

(56) References Cited

U.S. PATENT DOCUMENTS

| | | | |
|---|---|---|---|
| 1,974,158 A * | 9/1934 | Okenfuss ................ 248/651 |
| 2,196,892 A | 4/1940 | Berndt |
| 2,370,048 A * | 2/1945 | Koch ..................... 248/651 |
| 2,707,659 A * | 5/1955 | Sloyan ..................... 384/37 |
| 2,828,931 A * | 4/1958 | Herbert .................... 410/46 |
| 2,934,384 A * | 4/1960 | Sloyan ..................... 384/42 |
| 3,190,041 A * | 6/1965 | Kimball ................... 248/679 |
| 3,248,996 A * | 5/1966 | Larson .................... 411/368 |
| 3,334,850 A * | 8/1967 | Jackson et al. ........... 248/679 |
| 3,652,044 A * | 3/1972 | Manross .................. 248/657 |
| 3,753,407 A * | 8/1973 | Tilseth .................... 108/53.3 |
| 3,877,671 A * | 4/1975 | Underwood .......... 248/346.03 |
| 4,120,210 A * | 10/1978 | Sloyan ..................... 474/26 |
| 4,216,933 A * | 8/1980 | Cramer, Jr. ............. 248/188.5 |
| 4,239,139 A * | 12/1980 | Bott ....................... 224/324 |
| 4,252,380 A * | 2/1981 | Sloyan et al. ............. 384/13 |
| 4,700,923 A * | 10/1987 | Lewis et al. ............. 248/679 |
| 5,024,002 A * | 6/1991 | Possati .................... 33/549 |
| 5,277,395 A * | 1/1994 | Smith et al. ............. 248/679 |
| 5,348,142 A * | 9/1994 | Nishimura et al. .... 198/867.08 |
| 5,975,480 A * | 11/1999 | Schaefer et al. .......... 248/678 |
| 6,276,285 B1 * | 8/2001 | Ruch ..................... 108/57.13 |
| 6,405,992 B1 * | 6/2002 | Palmer .................... 248/679 |
| 6,557,814 B1 * | 5/2003 | Rutz ....................... 248/505 |

* cited by examiner

*Primary Examiner*—Anita M. King

(57) ABSTRACT

Disclosed is a frame for telecommunications equipment having a number of plates made slidable so as to be adjustable along the frame's length. The frame also has removable feet which suspend the frame above the floor and a number of strap receiving pins (or rings) to which straps can be attached in order that the frame can be lowered into a hole in the ground during installation.

11 Claims, 5 Drawing Sheets

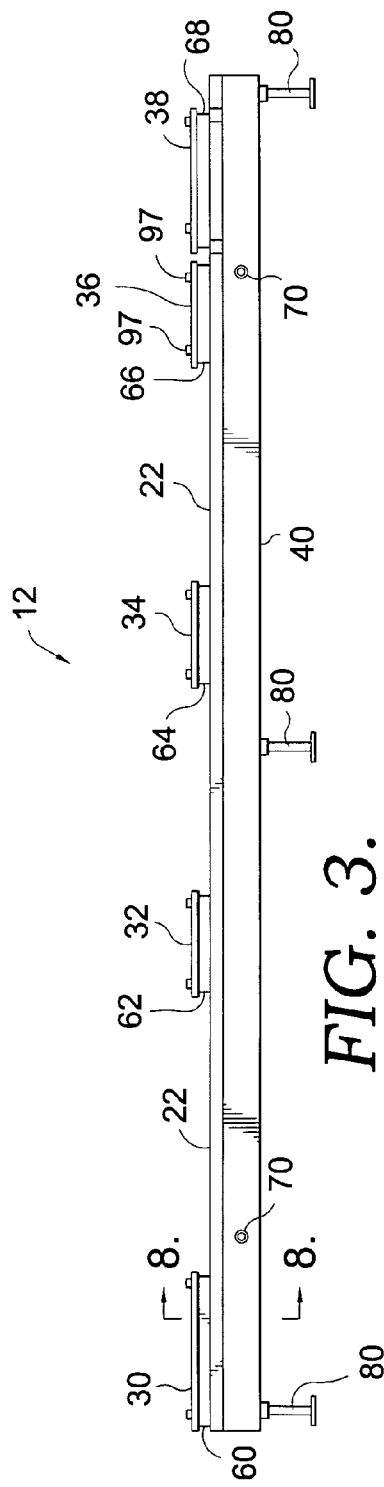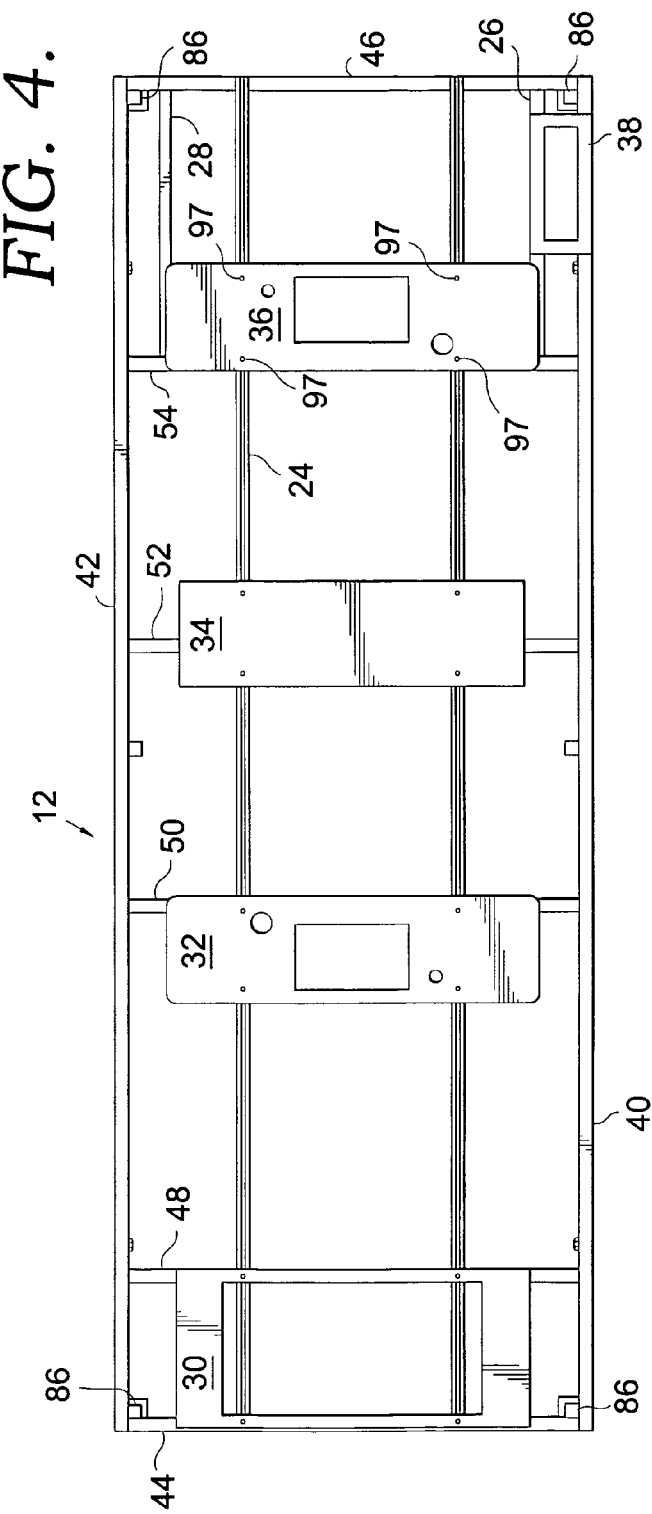

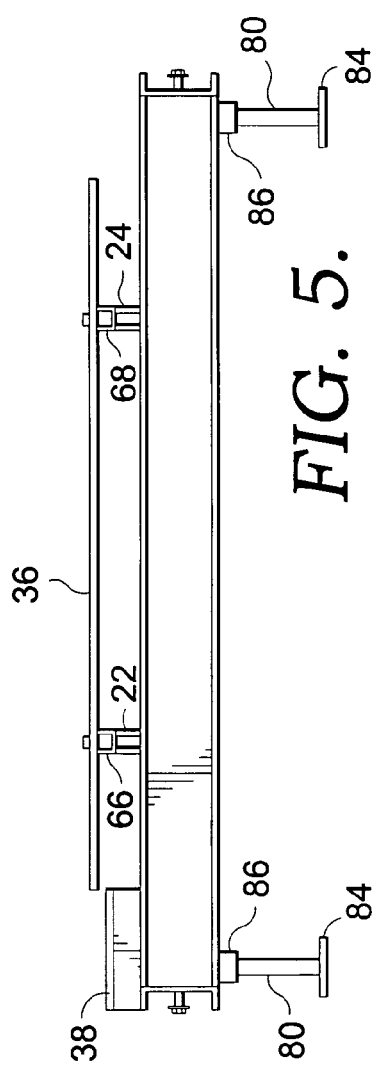
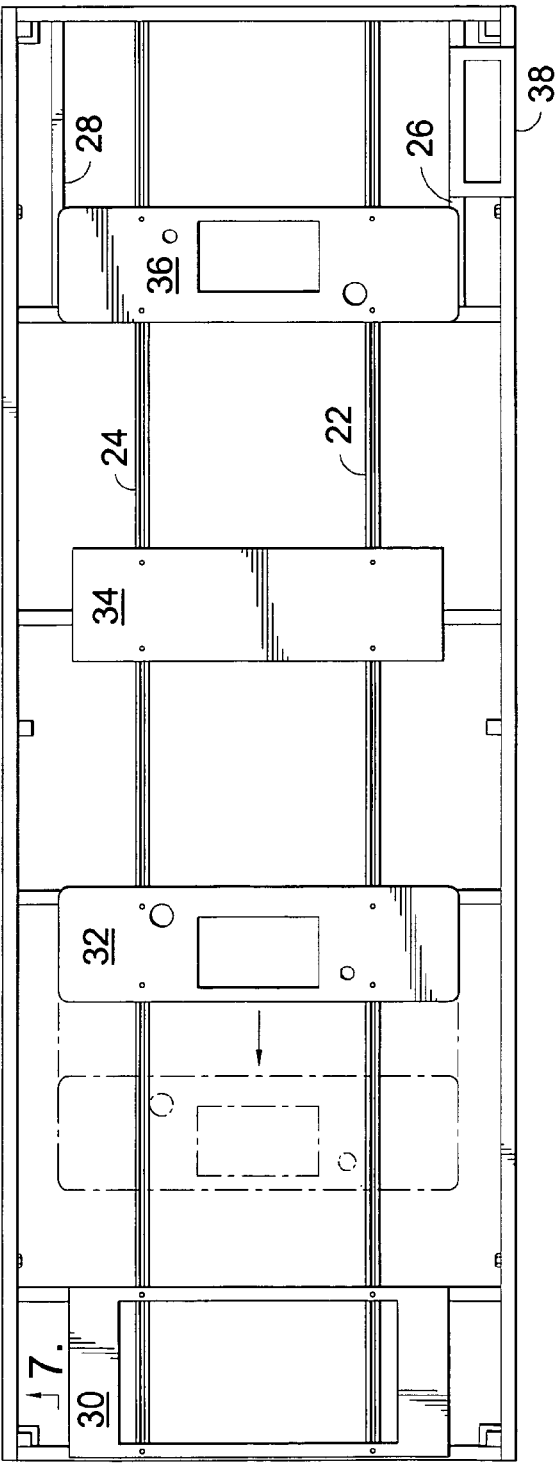
FIG. 5.
FIG. 6.

US 7,077,375 B1

FRAME FOR SUPPORTING TELECOMMUNICATIONS EQUIPMENT

CROSS-REFERENCES TO RELATED APPLICATIONS

This application is a continuation of U.S. patent application Ser. No. 10/288,108 filed Nov. 5, 2002 now U.S. Pat. No. 6,981,685.

BACKGROUND OF THE INVENTION

1. Field of the Invention

The invention relates generally to the field of supporting telecommunications equipment. More specifically, the invention relates to the field of frames used to support telecommunications equipment. Once the equipment is attached to the frame, the frame and attached equipment are installed in the field by lowering the frame into a recess in the ground. The frame is then encased in concrete exposing the equipment.

2. Description of the Related Art

Metal frames have been used in the prior art to support telecommunications equipment. One such frame is referred to as the "Bratton" model. The Bratton frame has two longitudinal side members which are parallel one to the other. They are connected at their ends by two end members transverse to the side members. These end members are also parallel to one another. The side members are permanently welded to the ends of the end members. The rectangular frame defined by the side and end members also has a number of permanently fixed cross bars. These cross bars are welded at their ends to the side members.

These cross bars directly support the equipment on the Bratton frame. This causes problems. First, because of the limited surface area provided by the cross bars, there are large unsupported gaps between cross members. This makes it difficult to place the telecommunications equipment thereon. Additionally, articles of equipment (e.g., batteries) may fall through the frame as a result. Second, because the cross bars are fixed by welding, and because different kinds of equipment may require different support bar configurations, it is impossible to preweld the frames. Rather, each frame must be custom welded to match the particular equipment desired to be installed.

Another problem with the Bratton frame is that, because it rests directly on the ground, wiring is made difficult. It is often necessary to run cable (from the cabinet) slightly beneath the level of the frame when preparing 900 or 1200 pair cable as part of "pre-running" the telecommunications assembly. The fact that the Bratton frame rests directly on the ground sometimes will cause this cable to become undesirably bent. However, if the frame were to be suspended above the ground, this problem would be avoided.

Another problem with the Bratton frame is that it is difficult to lower it into the ground once at site of installation. Such frames are extremely heavy, and thus, are usually lowered using straps. However, there is no convenient place on the Bratton frame in which the straps are to be attached. Thus, users often simply loop the straps around the side and end members. This, however, is a risky venture, in that the straps may slide on the members. Additionally, there are balance concerns. Therefore, there is a need for a method of attaching the straps to the frame that will not result in such sliding and that will maintain proper balance when the frame is lowered.

BRIEF SUMMARY OF THE INVENTION

The telecommunications frame of the present invention solves all of these problems present in the prior art frames by providing a frame having two spaced, substantially parallel, longitudinal side members; two spaced, substantially parallel, transverse end members; the longitudinal and transverse members being in substantially the same plane and together defining a frame. The frame also has two longitudinal slide rails which receive a number of slidable plates that are mounted on the slide rails. The plates are secured using special releasable clamps.

The frame may also optionally have a plurality of legs secured to and extending down from said frame. These legs are removably secured to the frame using a sleeve, reciprocating holes bored through each sleeve and leg, and an L-pin.

The frame may also have a plurality of strap receiving members on the outside of the longitudinal side members adapted to receive straps enabling the frame to be lowered into a recess for installation. These strap receiving members may be simple pins, or pins with rings.

BRIEF DESCRIPTION OF THE SEVERAL VIEWS OF THE DRAWINGS

FIG. 3 shows a side view of the telecabinet frame.

FIG. 4 shows the telecabinet frame from above.

FIG. 5 shows an end view of the telecabinet frame.

FIG. 6 shows the slidable nature of the support plates of the present invention.

DETAILED DESCRIPTION

Figure 1:
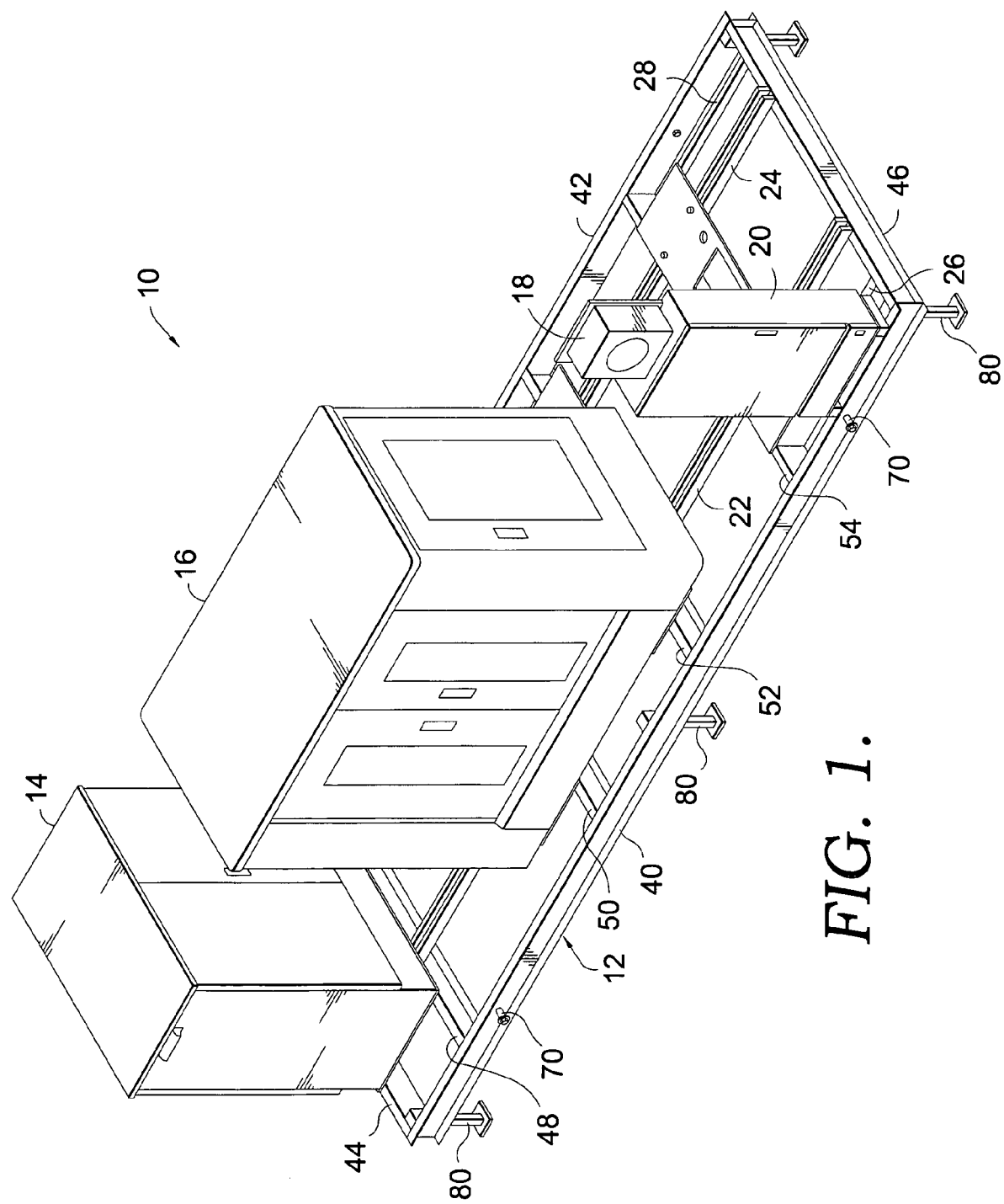
FIG. 1 shows the telecabinet frame of the present invention with the telecommunications equipment attached to the top thereof.

FIG. 1 shows the teleframe 12 assembly with telecommunications equipment attached to the top thereof before installation. The typical telecommunications assembly 10 comprises a cross-box 14, an electronics cabinet 16, and a meter box 18 which is secured on the top of a power pedestal 20. Cross-box 14 is used to interface with the customer side of a telecommunications network, by linking cabling between customers and the electronics in cabinet 16. Cabinet 16 contains the electronics (i.e., multiplexor, transports, batteries) necessary to support the system. Meter box 18 and power pedestal 20 receive commercial AC power and convert it to comply with local code requirements. This equipment is attached to the top of the telecommunications frame 12 which is the subject of this invention. It is important to note that this invention is not limited in scope to any particular equipment arrangement. The cross-box 14/cabinet 16/meter box 18/power pedestal 20 arrangement is shown here only for exemplary purposes.

Figure 2:
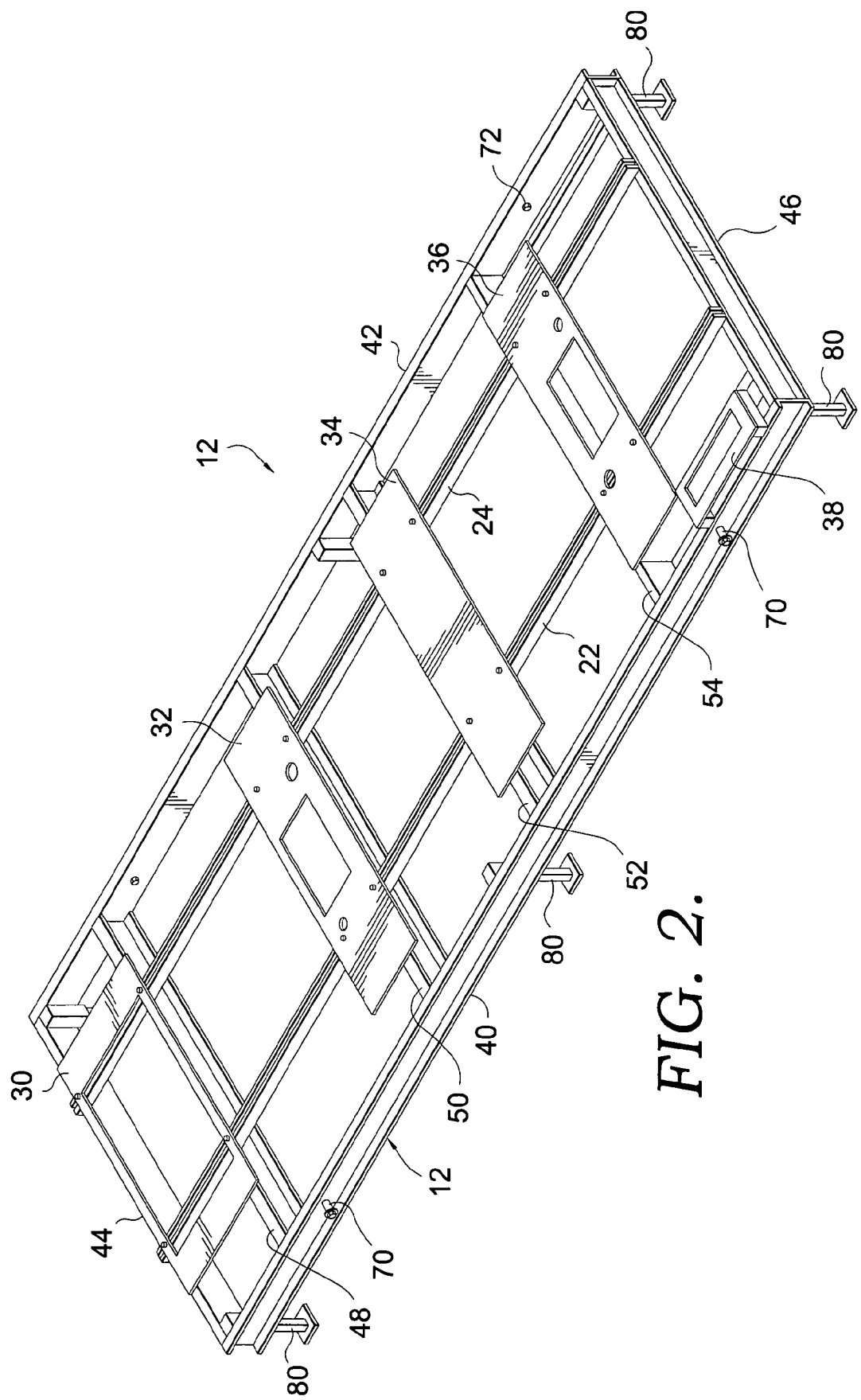
FIG. 2 shows a perspective view of the telecabinet frame with the telecommunications equipment removed.

Referring now to FIG. 2, the details of the telecommunications frame 12 are shown. Frame 12 comprises at its periphery, a first longitudinal side member 40 and a second longitudinal side member 42 which are substantially parallel to one another. Side members 40 and 42 are connected at their ends by first 44 and second 46 end members which are substantially parallel to one another. Side members 40 and 42 may be joined to end members 44 and 46 by welding, fasteners, or any other way known to those skilled in the art. The rectangular frame 12 defined by the side and end members is further supported by a first cross-member 48, second cross-member 50, third cross-member 52, and a fourth cross-member 54. These cross-members 48, 50, 52, 54, are connected at their ends to side members 40 and 42 by welding, fasteners, or any other way known to those skilled in the art. They are also substantially parallel to end members 44 and 46. Cross-members 48, 50, 52 and 54, along with end members 44 and 46, serve to support a pair of slide rails 22, 24 thereon. Slide rails 22 and 24 are substantially parallel to side members 40 and 42. As can be seen in FIGS. 5, 6, 8, and 9, each of slide rails 22 and 24 are comprised of two bars, each bar simply welded to the tops of cross-members 48, 50, 52 and 54 and end members 44 and 46 in an upright position (See figures).

Slide rails 22 and 24 are used to support any number of slidable support plates. See e.g., 30, 32, 34, and 36. Of these plates, a cross-box support plate 30 serves to provide support for cross-box 14, said cross-box 14 being fastened to plate 30. First and second cabinet support plates 32, 34 together support the electronics cabinet 16. A free plate 36 is used in the instance that additional equipment is necessary to be supported by frame 12. Plates 30, 32, 34, and 36 are not fixed directly to slide rails 22 and 24, however. Rather, plates 30, 32, 34, and 36 are placed atop strut members 60, 62, 64, and 66 respectively. See FIG. 3. Strut members 60, 62, 64, and 66 are used as part of a novel method of clamping the plates to the frame which enables the plates to be slidable.

Figure 8:
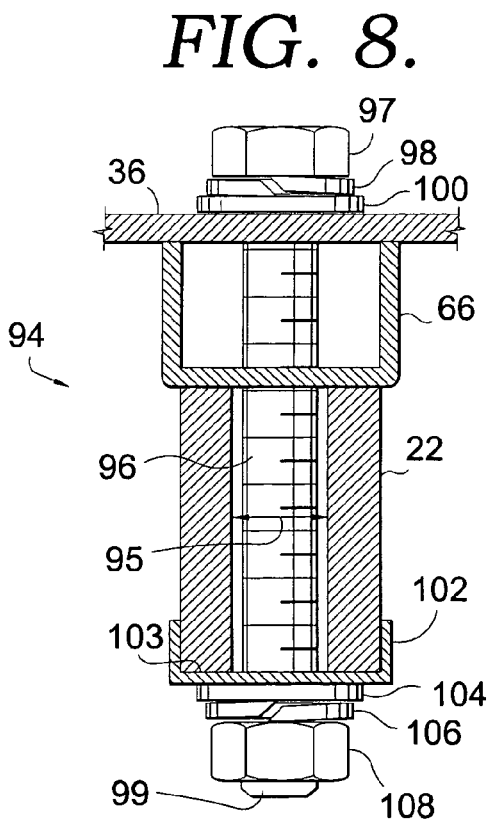
FIGS. 8 and 9 show the clamping assembly of the invention.
Figure 9:
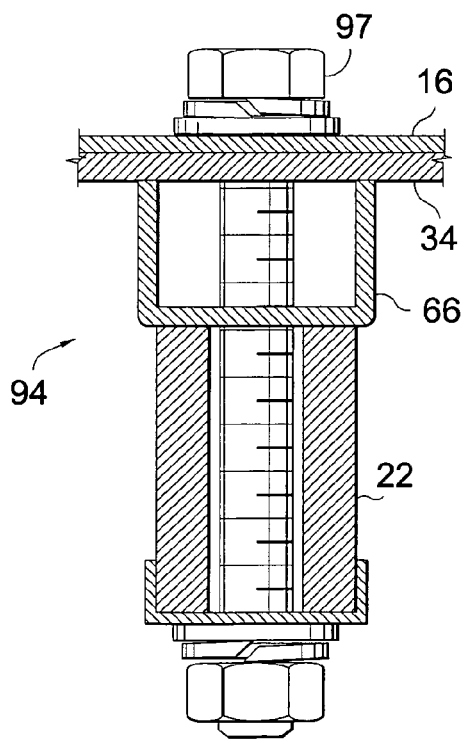

The way in which plates 30, 32, 34 and 36 are made slideable, is by use of clamping assembly 94 which is disclosed in FIGS. 8 and 9. FIG. 8 shows the use of the clamping assembly where it is used to secure free plate 36 to slide rail 22. Because free plate 36, as shown, does not secure any particular equipment thereto (like plates 30, 32, and 34) the assembly 94 simply secures a plate to the particular slide rail 22. Clamping assembly 94 uses a basic bolt 96 with a head 97 and a threaded end 99, upon which is received a nut 108. Bolt 96 is simply passed through a hole drilled through plate 36 and a reciprocating hole (not pictured) drilled through strut 66. After passing through strut 66, the bolt passes through a gap 95. Gap 95 is defined by the slide rail 22. A gutter-like reciprocating rail 102 defining a channel 103 which conforms to the lower part of the slide rail 22. Reciprocating rail 102 helps perform a clamping function to secure plate 36, strut 66, and slide rail 22 together. Lock washer 98 and flat washer 100 beneath head 97 are used to place compressive forces on plate 36 from above. Nut 108, lock washer 106, and flat washer 104 are used to apply compressive forces on reciprocating rail 102 from below. Thus, to fixedly secure plate 36 in place on the frame, the four clamping assemblies on that plate should be clamped by tightening the bolts. In order to slide the plate to a new location on the frame, the bolts should be loosed. To remove a plate, all of the bolts on that plate should be completely removed.

Like principles would apply to the same clamping assembly 94 when used to attach a cabinet 16, as shown in FIG. 9. The only difference being that a portion of the floor of the cabinet 16 is also compressively secured underneath the head of the bolt 97. This holds cabinet 16 in place on plate 34. Replicas of the same clamping assembly 94 are used in a similar fashion to secure cabinet 16 to plate 32, and to secure the floor of cross box 14 plate 30.

The fact that these plates are made slidable by the adjustment of clamping assemblies 94, described above makes the frame of the present invention much more versatile than those that existed in the prior art. FIG. 6 shows the slidable nature of plates 30, 32, 34, and 36 on frame 12. Plate 32 in particular is shown (by broken lines) as being slidable. However, it is to be understood that all of plates 30, 32, 34, and 36 are slidable, not just 32. Plate 32 is merely selected as an example. Because these plates are slidable, they can be adjusted to conform to any desired cabinet placement on the frame. This means that the frame does not have to be prewelded like the prior art frames. This is because no welding is necessary to make adjustments to where the support plates are located on the frame. A frame may simply be pulled of the shelf, and adjusted to fit.

The fact that plates (like those shown in FIG. 2 at 30, 32, 34, and 36) are used on the frame of the present invention is another advantage over the prior art frames. You will recall that equipment on the prior art frames (e.g., batteries) tended to fall out through the bottom of the cabinet. This is because the prior art frames do not have plates—only cross bars. Cross bars have much less surface area than do plates. The additional surface area provide by the plates prevents non-fixed articles within the cabinet (e.g., batteries) to be better contained, and prevents them from falling out.

Besides the four support plates already described, a power pedestal support plate 38 exists in order to support power pedestal 20. See FIG. 2. Plate 38 is supported from underneath by both side member 40 and a first short support 26. A second short support 28 is provided. Short supports 26 and 28 create additional stability at the fore-end 46 of the frame. Like plates 30, 32, 34, and 36, power pedestal support 38, is also supported on top of strut members 68. See FIG. 3.

Figure 7:
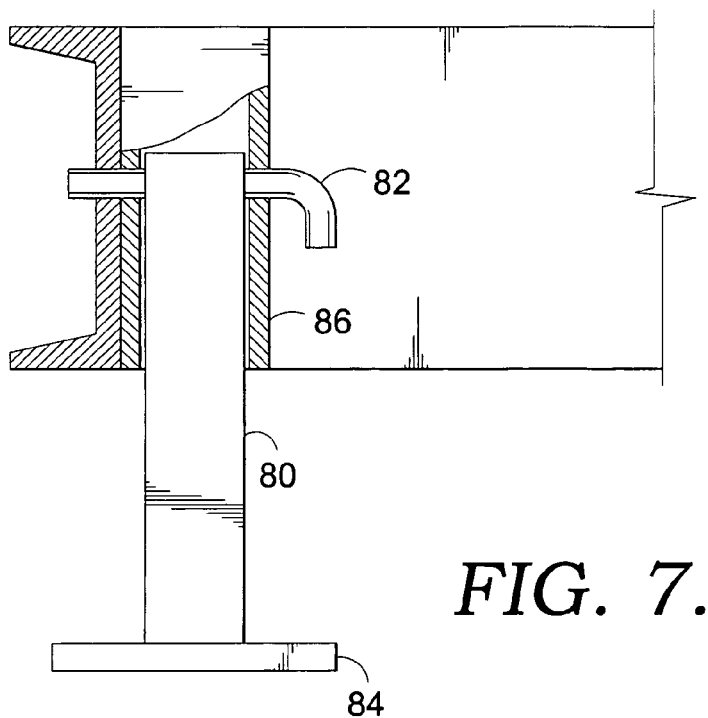
FIG. 7 shows the leg of the telecabinet frame as it is attached using an L-pin.

Another novel component of the invention is disclosed in detail in FIGS. 3 and 7. Frame 12 is suspended above the ground using six legs 80. Each leg 80 is secured to the frame by being received in a tube 86. Each of tubes 86 are welded (or otherwise fixed) to frame 12. See FIG. 4. Legs 80 each have feet 84 which serve to provide additional stability. Each leg 80 is removably securable to the frame by the use of an L-shaped pin arrangement. In order that this attachment be accomplished, each leg 80 has a hole (not pictured) bored there through transverse to its length. Tube also has a pair of reciprocating holes (not pictured) bored transversely therethrough. To secure leg 80 to the frame, it is inserted into tube 86 and slid up until the hole (not pictured) in the leg 80 is even with the hole (not pictured) in the tube 86. The alignment of these holes enables user to insert L-shaped pin 82 therein. This causes leg 80 to be securely held to frame 12.

Another novel feature of the present invention The telecabinet frame 12 also uses hoist bolts 70 (or pins) which are used to receive straps which enable the frame to be lifted in and out of a recess in the ground. Four bolts 70 are connected to the frame using four receiving nuts 72 which are located at different parts and represented in FIG. 4. Receiving nuts 72 simply are threaded holes defined by side members (or welded to said side members) within which bolts 70 are received. Instead of plain bolts 70, bolts with ring shaped heads (not pictured) could be used to enable the straps to me held more securely to the frame for hoisting purposes.

Thus, there has been shown and described a telecabinet frame which fulfills all of the object and advantages sought therefore. Many changes, modifications, variations, and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

We claim:

1. A device for supporting telecommunications equipment, said device comprising:
   a first rail on a frame;
   a first plate slidable on said first rail, said first rail positioning said first plate a distance apart from said frame;
   a second plate positioned said distance apart from said frame by said first rail and slidable independently of said first plate on said first rail, said first and second plates adapted to support said telecommunications equipment;
   said frame elevated on a plurality of feet;
   a second rail on said frame, said second rail being substantially parallel to said first rail, said first and second rails together defining a track on which first and second plates are independently and longitudinally moveable, one relative to the other; and,
   clamping mechanisms on said first and second rails, said clamping mechanisms being securable to prevent the movement of said plates and releasable to enable said plates to slide along said rails, said clamping mechanisms enabling the repositioning of said plates to accommodate a plurality of support requirements presented by said equipment.

2. The device of claim 1 wherein each of said clamping mechanisms comprise:
   a bolt received through an aperture in one of said plates and through a gap defined by a pair of bars which are comprised by one of said first and second slide rails, said bolt having a threaded end;
   a nut adapted to be received by said threaded end of said bolt;
   said one of said first and second plates being secured to said one of said first and second slide rails when said nut is tightened; and
   said one of said first and second plates being slidable relative to said one of said first and second slide rails when said nut is loosened.

3. The device of claim 2 further comprising:
   a reciprocating member defining a channel, said channel configured to encompass said one of said first and second rails for clamping purposes, said member also defining a bolt hole, said bolt hole enabling said bolt to pass through said member enabling it to be releasably secured by said nut to effectively clamp said plate to one of said first and second slide rails.

4. A device for supporting telecommunications equipment, said device comprising:
   a first rail on a frame;
   a first plate slidable on said first rail, said first rail positioning said first plate a distance apart from said frame;
   a second plate positioned said distance apart from said frame by said first rail and slidable independently of said first plate on said first rail, said first and second plates adapted to support said telecommunications equipment;
   said frame elevated on a plurality of feet and having two substantially parallel longitudinal members and two transverse end members, said longitudinal and transverse members being in substantially the same plane.

5. A device for supporting telecommunications equipment, said device comprising:
   a first rail on a frame;
   a first plate slidable on said first rail, said first rail positioning said first plate a distance apart from said frame;
   a second plate positioned said distance apart from said frame by said first rail and slidable independently of said first plate on said first rail, said first and second plates adapted to support said telecommunications equipment;
   said frame elevated on a plurality of feet; and
   said first rail includes a pair of substantially parallel bars, said bars defining a bolt-receiving gap therebetween which is adapted to receive a bolt, said bolt removeably securing one of said first and second plates to said first rail.

6. A device for supporting telecommunications equipment, said device comprising:
   a first rail on a frame;
   a first plate slidable on said first rail, said first rail positioning said first plate a distance apart from said frame;
   a second plate positioned said distance apart from said frame by said first rail and slidable independently of said first plate on said first rail, said first and second plates adapted to support said telecommunications equipment;
   said frame elevated on a plurality of feet; and
   a releasable clamp, said clamp having a bolt with a head and threaded end;
   a hole in one of said first and second plates through which said bolt passes through;
   said bolt received through a gap defined by a pair of bars which comprise said first slide rail;
   a nut adapted to be received by said threaded end of said bolt;
   said plate being secured to said first slide rail when said nut is tightened; and
   said plate being slidable relative to said first slide rail when said nut is loosened.

7. A device for supporting telecommunications devices, said device comprising:
   a frame;
   a first rail on said frame; and
   a second rail on said frame, said first and second rails on said frame being substantially parallel one to the other to define a dually-supported track on which a first plate and a second plate are longitudinally slidable independently, one from the other, said first and second plates separated from said frame by a distance, thus adapting said frame to accept support requirements of said telecommunications equipment; and
   clamping mechanisms on said first and second rails, said clamping mechanisms being securable to prevent the movement of said plates and releasable to enable said plates to slide along said rails to enable the repositioning of said plates to accommodate a plurality of support requirements of said equipment.

8. The device of claim 7 wherein each of said clamping mechanisms comprise:
   a bolt received through an aperture in one of said plates and through a gap defined by a pair of bars which are comprised by one of said first and second slide rails, said bolt having a threaded end;

a nut adapted to be received by said threaded end of said bolt;

said one of said first and second plates being secured to said one of said first and second slide rails when said nut is tightened; and said one of said first and second plates being longitudinally slidable relative to said one of said first and second slide rails when said nut is loosened.

9. The device of claim 8 further comprising:

a reciprocating member defining a channel conformed to encompass said one of said first and second rails for clamping purposes, said member also defining a bolt hole, said bolt hole enabling said bolt to pass through said member enabling said one of said first and second slide rails to be more effectively clamped to said one of said first and second plates.

10. A device for supporting telecommunications devices, said device comprising:

a frame;

a first rail on said frame; and a second rail on said frame, said first and second rails on said frame being substantially parallel one to the other to define a dually-supported track on which a first plate and a second plate are longitudinally slidable independently, one from the other, said first and second plates separated from said frame by a distance, thus adapting said frame to accept support requirements of said telecommunications equipment, said frame including two substantially parallel longitudinal members, and two transverse end members, said longitudinal and transverse members being in substantially the same plane.

11. A device for supporting telecommunications devices, said device comprising:

a frame;

a first rail on said frame;

a second rail on said frame, said first and second rails on said frame being substantially parallel one to the other to define a dually-supported track on which a first plate and a second plate are longitudinally slidable independently, one from the other, said first and second plates separated from said frame by a distance, thus adapting said frame to accept support requirements of said telecommunications equipment;

a releasable clamp, said clamp having a bolt with a head and threaded end;

a hole in one of said first and second plates through which said bolt passes through;

said bolt received through a gap defined by a pair of bars which comprise said first slide rail;

a nut adapted to be received by said threaded end of said bolt;

said plate being secured to said first slide rail when said nut is tightened; and said plate being slidable relative to said first slide rail when said nut is loosened.

* * * * *